United States Patent
Mase et al.

(10) Patent No.: US 9,144,884 B2
(45) Date of Patent: Sep. 29, 2015

(54) SCRIBING METHOD USING BLASTING MACHINE

(71) Applicant: FUJI MANUFACTURING CO., LTD., Tokyo (JP)

(72) Inventors: Keiji Mase, Tokyo (JP); Masato Hinata, Tokyo (JP)

(73) Assignee: FUJI MANUFACTURING CO., LTD., Tokyo (JP)

( * ) Notice: Subject to any disclaimer, the term of this patent is extended or adjusted under 35 U.S.C. 154(b) by 123 days.

(21) Appl. No.: 13/964,326

(22) Filed: Aug. 12, 2013

(65) Prior Publication Data

US 2014/0065930 A1    Mar. 6, 2014

(30) Foreign Application Priority Data

Aug. 30, 2012    (JP) .................................. 2012-190395

(51) Int. Cl.
*B24C 1/04*    (2006.01)
*B24C 5/04*    (2006.01)

(52) U.S. Cl.
CPC . *B24C 1/045* (2013.01); *B24C 5/04* (2013.01); *Y02E 10/541* (2013.01)

(58) Field of Classification Search
CPC ........ B24C 1/045; B24C 5/04; B24C 7/0023; B24C 7/0038
See application file for complete search history.

(56) References Cited

U.S. PATENT DOCUMENTS

| | | | |
|---|---|---|---|
| 3,888,054 A * | 6/1975 | Maselli | 451/38 |
| 5,083,402 A * | 1/1992 | Kirschner et al. | 451/38 |
| 7,040,960 B2 * | 5/2006 | Hench et al. | 451/38 |
| 7,329,126 B2 * | 2/2008 | Cook et al. | 433/215 |
| 2008/0176190 A1 * | 7/2008 | Cook et al. | 433/216 |
| 2012/0021676 A1 * | 1/2012 | Schubert et al. | 451/38 |
| 2013/0303053 A1 * | 11/2013 | Mase et al. | 451/31 |

FOREIGN PATENT DOCUMENTS

| | | |
|---|---|---|
| JP | 09-260704 | 10/1997 |
| JP | 2000-124490 | 4/2000 |
| JP | 2008-264912 | 11/2008 |

* cited by examiner

*Primary Examiner* — Timothy V Eley
(74) *Attorney, Agent, or Firm* — Cooper Legal Group, LLC

(57) ABSTRACT

To provide a scribing method by blasting that allows forming a groove at high accuracy without masking, a blasting machine that includes an ejection nozzle having a slit-shaped ejection opening with a width of 10 to 500 μm and a length of 5 to 5000 times the width, and an abrasive with a median diameter equal to or less than one-half of a width of the ejection opening of the ejection nozzle and with a maximum particle diameter smaller than a width of the ejection opening are used; and the abrasive is ejected together with compressed gas on a surface of a workpiece at an ejection distance of 0.1 to 3.0 mm and an ejection pressure of 0.2 MPa to 0.6 MPa without masking so that 0.25 $cm^3$ or less of the abrasive is included per 1000 $cm^3$ of the compressed gas discharged from the ejection nozzle.

4 Claims, 5 Drawing Sheets

FIG. 3
(A)
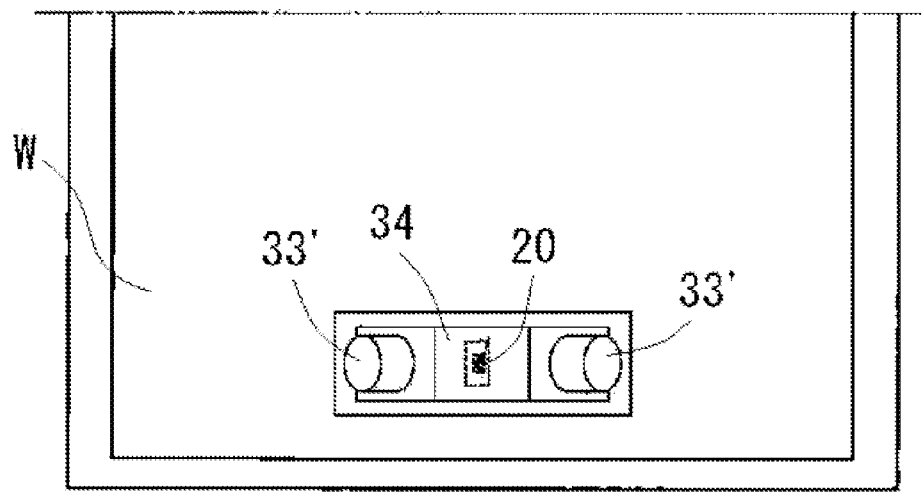
(B)
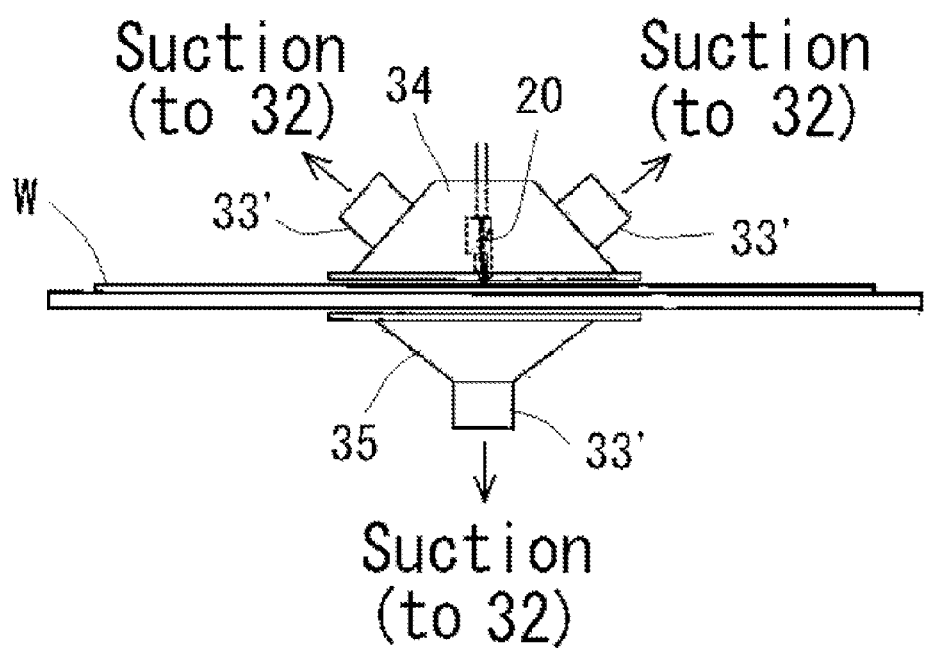

SCRIBING METHOD USING BLASTING MACHINE

BACKGROUND OF THE INVENTION

1. Field of the Invention

The present invention relates to a scribing method for forming a groove and a cut-off line on a workpiece and a blasting machine used for the scribing. More specifically, the present invention relates to a scribing method by blasting that ejects an abrasive together with compressed gas and a blasting machine used for the method.

2. Description of the Related Art

A scribing, which forms a groove and a cut-off line on a workpiece, is used to form a groove serving as a break starting point when a hard brittle material such as a glass is cut. The scribing is also used to cut and divide a conductive film and a semiconductor film formed on a substrate into a predetermined pattern during fabrication of a semiconductor device or similar case.

The following describes an exemplary solar cell as one example of the semiconductor device. A solar cell panel includes a conducting layer, a photoelectric conversion layer, a buffer layer, and a transparent electrode layer. The conducting layer is disposed on a glass substrate and serves as a rear surface electrode. The photoelectric conversion layer is formed on the conducting layer. The buffer layer and the transparent electrode layer are formed on the photoelectric conversion layer. Each time the conducting layer, the photoelectric conversion layer, the buffer layer, and the transparent electrode layer are formed on the glass substrate, each of the layers are scribed at a predetermined pattern to cut and divide them. This forms a plurality of solar cells serially coupled on the glass substrate and also includes an integrated structure.

As a method for the scribing, conventionally, a laser scribing, a mechanical scribing, and a scribing by sand-blasting method are available.

Among them, the laser scribing adjusts the focal point of the laser to a surface of a workpiece and slides the workpiece placed on a processing table or a laser oscillator according to a preliminarily programmed process pattern precisely to form a cut-off line in the predetermined pattern. A processing apparatus used for the laser scribing is complicated and expensive apparatus, thus requiring a considerable initial investment.

Moreover, since the laser scribing is a process using heat, the laser scribing may deform the workpiece or change the workpiece in quality, therefore, there is a restriction to applicable material or the like.

There is a difficulty in a process of a transparent material where adjustment of the focal point of the laser is difficult. Also, this may cause a dross (a weld deposit of a melted material) to malfunction of the product or similar failure.

Among the above-described scribing methods, the mechanical scribing, for example, forms a groove by contacting the surface of the workpiece while rotating a grinding wheel formed by a diamond grindstone or the like at high speed and cutting of the surface of the workpiece in a predetermined pattern. As the work proceeds, a tool such as expensive grinding wheel wears out, and process accuracy changes even the wear of the tool is slight, therefore, the tools are required to be exchanged frequently. This requires a considerable running cost and stop of work during exchanging the tool, reducing productivity.

Accordingly, there is a demand for scribing by a blasting machine. The blasting machine has a comparatively simple apparatus configuration and therefore can be introduced at low-price compared with a process apparatus using laser. Moreover, the handling is easy, and only replenishing or exchanging the abrasive is required. Accordingly, the blasting machine allows continuous scribing without suspending work and without changing the process accuracy.

In response to the demand, scribing the conductive film, the photoelectric conversion layer, the transparent electrode, or the like, which are performed during the manufacturing process of the solar cell by blasting is proposed (Japanese LOPI Nos. H09-260704(JP1997-260704A) and JP2000-124490A).

Although not specialized in scribing, the applicant of the application has already proposed a disc-type apparatus for supplying a constant quantity of abrasives as an apparatus for supplying as constant quantity of abrasive 10. The apparatus for supplying a constant quantity of abrasive 10 aims to improve processing accuracy or the like by stably supplying a constant quantity of abrasive to an ejection nozzle in blasting. Then, the abrasives precisely measured by a measuring hole 13a disposed at a disc 13 which rotates in an abrasive tank, are supplied to an ejection nozzle 20 together with compressed gas (see FIG. 1 below, related art: JP5183089B2 for detail).

The groove portions formed in the conducting layer, the photoelectric conversion layer, and the transparent electrode layer by scribing in the above-described manufacturing process of solar cell are required to be formed thin as much as possible. This improves power generation efficiency because the groove part does not contribute to electric generation when formed to be a solar cell.

In response to the request, in both inventions described in the above-motioned '704 and '490, masking is performed to cover the surface of the workpiece other than a part forming a groove with a protective texture before scribing by blasting. This allows the grooves in the predetermined pattern to be formed on the surface of the workpiece.

Accordingly, in the above-described manufacturing example of solar cell, every time the conducting layer, the photoelectric, conversion layer, the buffer layer, and the transparent electrode layer are formed, masking is required by a method such as printing of the protective texture in the predetermined pattern at high accuracy. Also, after scribing by blasting, removing the protective texture mounted during masking is required by washing or another method. If the grooves or the like can be formed at high accuracy by ejecting the abrasive directly on the surface of the workpiece by blasting without masking, some manufacturing processes can be omitted and the volume of the materials to be used can be reduced. Accordingly, scribing by blasting can be performed at further low cost, and drastic reduction in time taken for the work is achieved.

On the other hand, in the case where a groove is formed by blasting in the known method without performing the above-described masking and using the known blasting machine, a groove with a width equal to or less than 1 mm cannot be formed. There is no existing blasting method that allows forming a fine groove, which is required in the above-described manufacture of solar cell or the like, without masking.

The scribing performed in the manufacturing process of solar cell is described above. However, an advantage in cost by achieving scribing by blasting, without masking and necessity of fine process accompanied by downsizing and weight saving of various products are also similarly demanded in a field other than manufacture of solar cell.

The present invention is made to solve the drawbacks in the above-described related art, and an object of the present invention is to provide a scribing method by blasting that allows forming a groove and a cut-off line on a workpiece at high accuracy without masking and a blasting machine used for the method.

SUMMARY OF THE INVENTION

Means for solving the problems are described below with reference numerals used in the detailed description of the preferred embodiments. These reference minerals are intended to clarify the correspondence between the descriptions in the claims and the descriptions in the detailed description of the preferred embodiments, and it is needless to say that these reference numerals should not be used to restrictively interpret the technical scope of the present invention.

In order to achieve the above objectives, a scribing method by blasting according to the present invention comprises:

using a blasting machine 1 that includes an ejection nozzle 20, the ejection nozzle 20 having a slit-shaped ejection opening 21 with a width $\delta$ of 10 μm to 500 μm and a length L of 5 to 5000 times the width $\delta$; and an abrasive with a median diameter equal to or less than one-half of a width $\delta$ of the ejection opening 21 of the ejection nozzle 20, the abrasive with a maximum particle diameter smaller than the width $\delta$ of the ejection opening 21 and ejecting the abrasive together with compressed gas on a surface of a workpiece W without masking at an ejection distance (a distance between a tip of the ejection nozzle 20 and the workpiece W) of 0.1 mm to 3.0 mm and at an election pressure of 0.2 MPa to 0.6 MPa so that 0.25 cm$^3$ or less of the abrasive is included 1000 cm$^3$ of the compressed gas discharged from the ejection nozzle under atmospheric pressure after the abrasive is discharged from the ejection nozzle 20 and released to the air.

In the scribing method configured as described above, the abrasive and cutting chip powder on the workpiece W may be sucked and recovered in a vicinity of a surface of the workpiece W in an ejection position of the abrasive.

Furthermore, in the above scribing method, it is preferable to use the abrasive with high specific gravity, more preferably, the abrasive has a specific gravity of equal to or more than 5.

In the scribing method according to the present invention, in the case where the workpiece W is a photoelectric conversion layer (for example, compound photoelectric conversion layer such as CIGS) formed on a conducting layer (for example, an Mo layer) of a solar cell and having a lower hardness than the conducting layer, preferably, the abrasive has a higher hardness than the photoelectric, conversion layer, and has a lower hardness than the conducting layer (for example, an abrasive made of stainless steel).

In a blasting machine 1 for performing the above scribing method according to the present invention, comprises:

an ejection nozzle 20 having a slit-shaped ejection opening 21 with a width $\delta$ of 10 μm to 500 μm and a length L of 5 to 5000 times the width $\delta$; and an apparatus for supplying a constant quantity of abrasive 10 where an abrasive is quantitatively supplied together with compressed gas to the ejection nozzle 20 so that an ejection quantity of the abrasive is to be an abrasive volume of equal to or less than 0.25 cm$^3$ relative to discharge gas amount 1000 cm$^3$ in a range of ejection pressure of 0.2 MPa to 0.6 MPa.

The blasting machine 1 configured as described above may comprise:

a flow path that includes an introduction flow path 22 and a rectifying portion 23, the introduction flow path 22 introducing a mixed fluid of compressed gas and an abrasive into the ejection nozzle 20, the rectifying portion 23 rectifying the mixed fluid introduced through the introduction flow path 22 to a slit-shaped flow and introducing the mixed fluid to the ejection opening 21, wherein the rectifying portion 23 is formed as a space defined by a first flat surface 24, an inclined surface 25, and a second flat surface 26 in a cross section parallel to a moving direction of the abrasive and perpendicular to a longitudinal direction of the ejection opening 21 (see FIG. 4-C), the first flat surface 24 being parallel to the moving direction of the abrasive, the inclined surface 25 gradually inclining while approaching the first flat surface 24 as the inclined surface 25 extending from the introduction flow path 22 to the ejection opening. 21, the second flat surface 26 being continuous with the inclined surface 25, and being parallel to the first flat surface 24 with a distance inbetween, and the distance is equal to a width $\delta\square$ of the ejection opening 21.

In any of the blasting machine 1 described above, a flow path (abrasive transport path 12) from the apparatus for supplying a constant quantity of abrasive 10 may be branched into a plurality of flow paths (branched flow paths 121, 122), each of the branched flow paths 121, 122 communicating with the ejection nozzle 20.

With the configuration of the above-described present invention, according to the scribing method and the apparatus of the present invention, a groove and a cut-off line with width equal to or less than 0.5 mm, further, with width equal to or less than 100 μm can be precisely formed by adjusting a condition, needless to say about a groove and a cut-off line with a width equal to or less than 1 mm, on a surface of a workpiece W without masking.

Consequently, this eliminates the need for masking, which is required in the scribing by the conventional blasting, and removal of a mask material. In accordance with the reduction in the number of processes, drastic reduction in process cost and working hours are achieved.

In scribing according to the method of the present invention, since a consumable part is an abrasive only, a stable process with maintaining the process accuracy can be continuously performed by exchanging or replenishing consumed abrasives. Different from the mechanical scribing described as the related art, the scribing according the present invention did not frequently suspend work due to exchange of the consumable part, thus improving productivity.

In the configuration that sucks and recovers the abrasive and cutting chip powder on the workpiece W in the ejection position of the abrasive by the ejection nozzle 20 in a vicinity of the surface of the workpiece W, a change in process accuracy due to presence of the remaining abrasive and dust can be prevented and scribing without leaving an adhering material on the surface of the workpiece W is achieved. This allows reduction in a failure due to the remaining adhering material.

Use of an abrasive with a high-specific gravity improves straightness of the abrasive after ejection from the ejection nozzle and allows highly accurate scribing. Especially, use of an abrasive with a specific gravity equal to or more than 5 allowed forming a groove with a width approximately equal to or less than 2.5 times the width of the ejection opening of the ejection nozzle.

Consequently, selecting the width of the ejection opening of the ejection nozzle 20 allowed forming even a groove with a width equal to or less than 100 μm, which is a width required for manufacture of a solar cell and manufacture of an electronic device without masking.

In the case where the workpiece W is a photoelectric conversion layer (for example, a compound photoelectric, conversion layer such as CIGS) formed on a conducting layer (for example, an Mo layer) of the solar cell and has lower hardness than the conducting layer, use of an abrasive with a higher hardness than the photoelectric conversion layer and with a lower hardness than the conducting layer (for example, an abrasive made of stainless steel) allowed selectively removing the photoelectric conversion layer only, without damaging the conducting layer (an under layer) formed under the photoelectric conversion layer.

A blasting machine 1 according to the present invention includes the ejection nozzle 20. The ejection nozzle 20 includes a first flat surface 24, an inclined surface 25, and a second flat surface 26 that define a rectifying portion 23. Although this configuration includes a narrow ejection opening 21 with a slit width of 10 μm to 500 μm, this preferably allowed preventing the clogging of the abrasive in the ejection nozzle 20.

Further, the blasting machine 1 branches as supply flow path from the apparatus for supplying a constant quantity of abrasive 10 into as plurality of flow paths, which are branched paths 121 and 122. The branched paths 121 and 122 each communicate with the ejection nozzle 20. Further, dividing the abrasive equally, which is quantitatively supplied by the apparatus for supplying a constant quantity of abrasive 10, into a plurality of flow paths allowed quantitatively-supplying even the small amount of abrasives precisely.

BRIEF DESCRIPTION OF THE DRAWINGS

The objects and advantages of the invention will become understood from the following detailed description of preferred embodiments thereof in connection with the accompanying drawings in which like numerals designate like elements, and in which:

FIG. 3A and FIG. 3B are explanatory drawings illustrating another embodiment of an abrasive suction opening: FIG. 3A is a plan view; and FIG. 3B is a front view;

FIG. 4A is a plan view; FIG. 4B is a front view; FIG. 4C is a cross-sectional view taken along the line C-C of FIG. 4B; and FIG. 4D is a bottom view of a portion of an ejection opening of the ejection nozzle.

DETAILED DESCRIPTION OF THE PREFERRED EMBODIMENT

Blasting Machine

Overall Configuration

Figure 1:
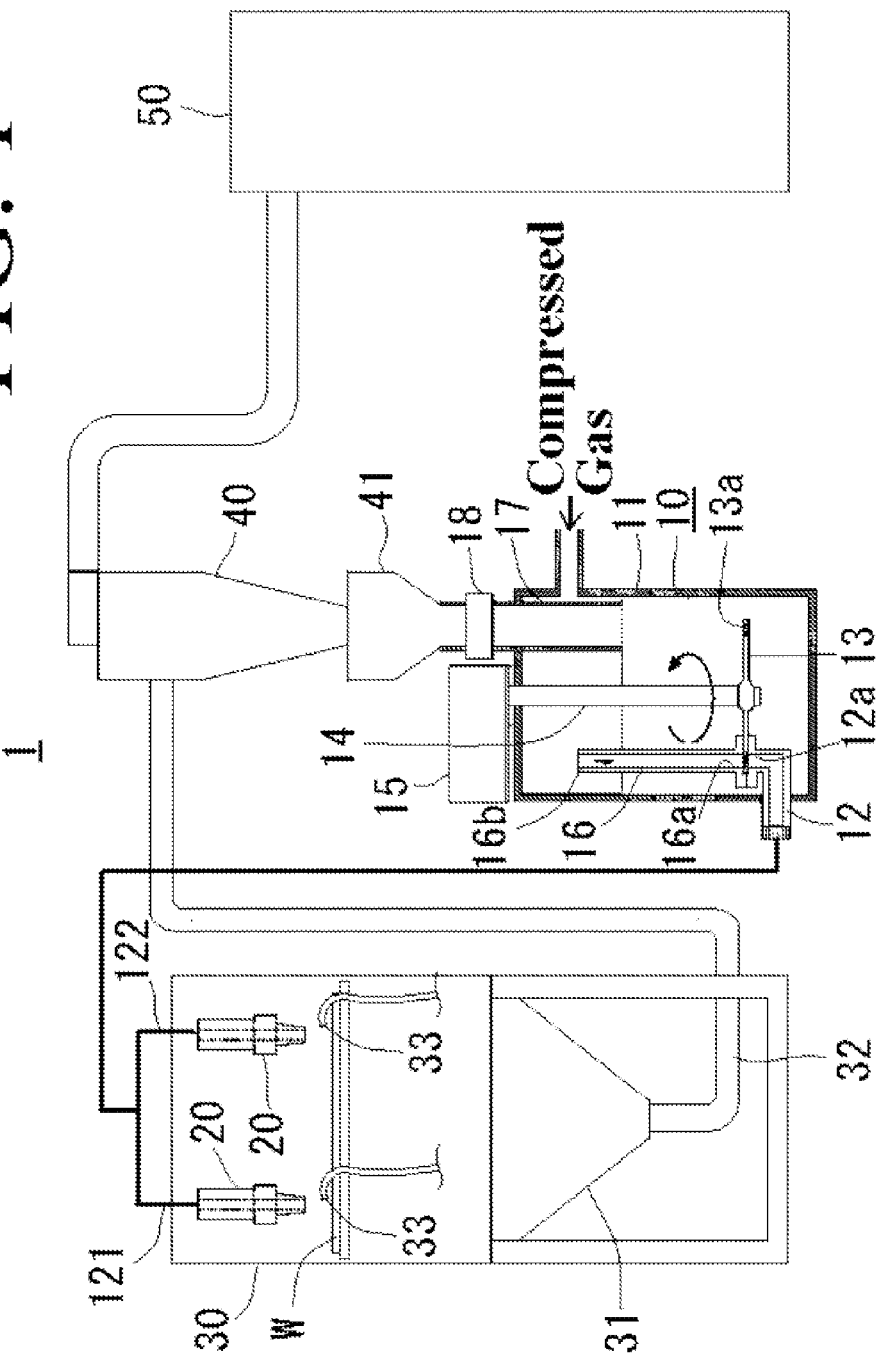
FIG. 1 is an explanatory drawing illustrating an exemplary configuration of a blasting machine used for scribing according to the present invention (direct pressure type)

An exemplary configuration of a blasting machine 1 used for a scribing according to the present invention is illustrated in FIG. 1.

As illustrated in FIG. 1, the blasting machine 1 used for the scribing according to the present invention includes an apparatus for supplying a constant quantity of abrasive 10 and an ejection nozzle 20. The apparatus for supplying a constant quantity of abrasive 10 quantitatively supplies abrasives together with compressed gas. The ejection nozzle 20 ejects at least the supplied abrasive. The embodiment illustrated in the drawing includes a processing chamber 30, a cyclone 40, and a dust collector 50. The processing chamber 30 houses the ejection nozzle 20. The cyclone 40 communicates with a lower end of a hopper 31 formed at the processing chamber 30 through an abrasive recovery pipe 32. The dust collector 50 sucks an inside of the cyclone 40. When the abrasive from the ejection nozzle 20 housed in the processing chamber 30 is ejected while the inside of the cyclone 40 is sucked by the dust collector 50, the ejected abrasive is introduced into the cyclone 40 together with cutting chip powder or the like through the abrasive recovery pipe 32. Wind power classification in the cyclone 40 recovers reusable abrasive in an abrasive recovery chamber 41 which communicates with the bottom of the cyclone 40, and the crushed abrasive and dust are sucked by the dust collector 50 and removed.

Instead of the configuration where the abrasive and the cutting chip powder are recovered from the lower end of the hopper 31 formed at the lower portion of the processing chamber 30 or together with this configuration, an abrasive suction opening 33 may be disposed. The abrasive suction opening 33 sucks and recovers the abrasive and the cutting chip powder ejected in a vicinity of the ejection position of the abrasive by the ejection nozzle 20 abrasive suction opening to remove and recover the abrasive and the cuffing chip powder from the workpiece W.

The embodiment illustrated in the drawing sucks an inside of the processing chamber 30 housing the workpiece W and recovers the abrasive and the cutting chip powder. However, instead of this configuration, for example, as illustrated in FIG. 3B, a pair of processing boxes 34 and 35 may be disposed so as to face vertically while interposing a movement allowable interval for the workpiece W between the processing boxes 34 and 35. While the ejection nozzle 20 disposed in the processing box 34 ejects the abrasive, the workpiece W may be processed by moving the processing boxes 34 and 35 or the workpiece W. In this case, insides of the processing boxes 34 and 35 may be sucked through abrasive suction openings 33' communicated with the spaces in the processing boxes 34 and 35 so as to recover the abrasive and the cutting chip powder. The blasting machine including the processing box has already been filed by the applicant of this application (JP2010-36324A).

Figure 2:
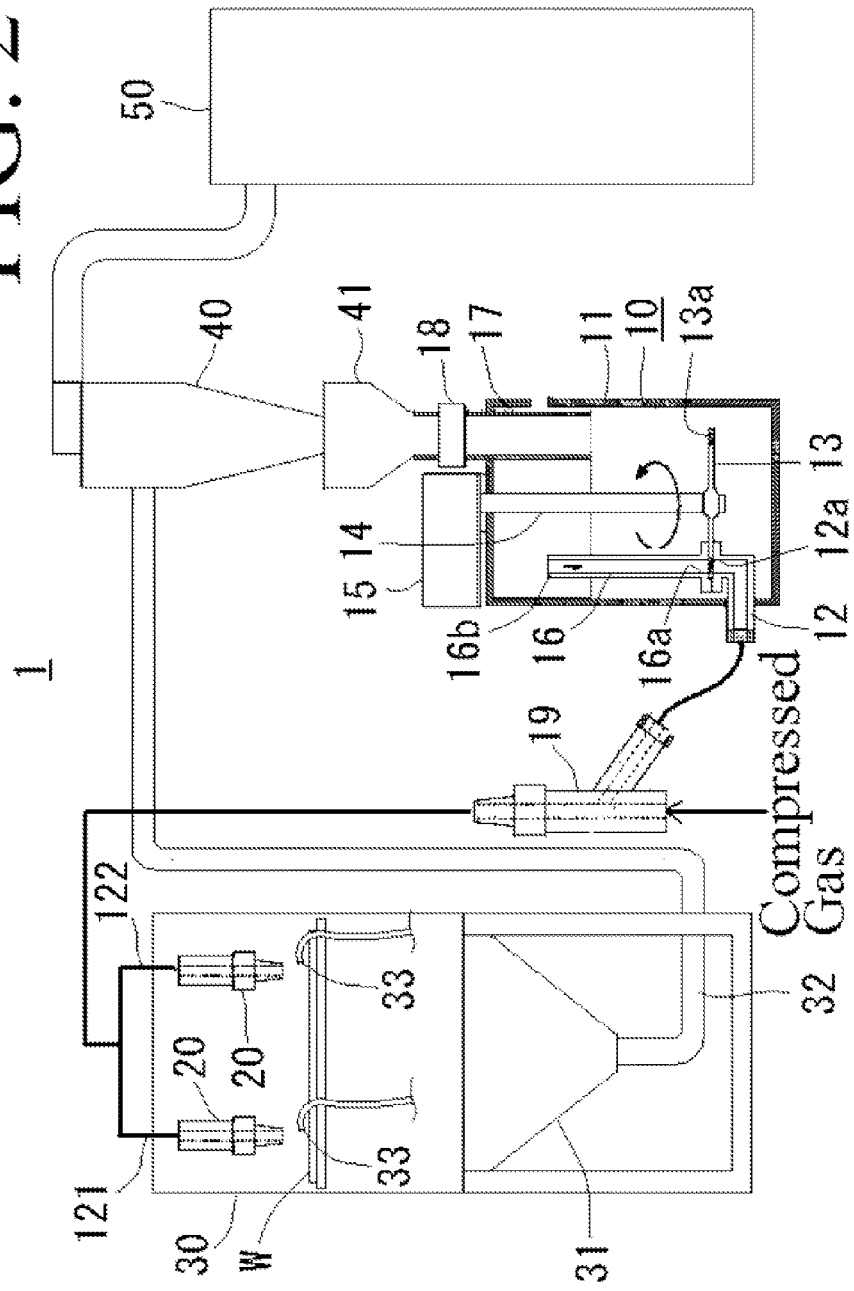
FIG. 2 is an explanatory drawing illustrating an exemplary configuration of the blasting machine used for scribing according to the present invention (suction type)

In the case where the processing boxes 34 and 35 are disposed, the processing chamber 30 illustrated in FIG. 1 and FIG. 2 may be omitted. Or, the processing may be done by housing the workpiece W and the processing boxes 34 and 35 in the processing chamber 30.

The embodiment in the drawing illustrates an exemplary configuration of the blasting machine where a reusable abrasive is segregated and recovered by the cyclone 40 for recycle. However, for example, the abrasive after the use of one time may be disposed without reuse. In this case, the cyclone 40 and the abrasive recovery chamber 41, which are disposed for wind power classification between dust such as cutting chip powder and abrasive, may be omitted. An abrasive and dust after use may be removed and recovered together by the dust collector 50 through the hopper 31 and the abrasive suction opening 33.

As the apparatus for supplying a constant quantity of abrasive 10, the known various apparatuses for supplying a constant quantity of abrasive are available insofar as abrasives are quantitatively-supplied together with compressed gas. However, in this embodiment, the disc-type apparatus for supplying a constant quantity of abrasive 10 similar to one proposed in JP5183089B2 described above is used as the apparatus for supplying a constant quantity of abrasive.

The apparatus for supplying a constant quantity of abrasive 10 includes an abrasive tank 11 for storing abrasives, an abrasive transport path 12 for conveying the abrasive in the abrasive tank 11 to the ejection nozzle 20, and a rotating disc 13 for measuring and introducing the abrasive into the abrasive transport path 12 at every constant quantity The rotating disc 13 is disposed in the abrasive tank 11 to be horizontally rotatable. Measuring holes 13a penetrating a wall thickness of the rotating disc 13 are arranged in a circumferential direction of the rotating disc 13 at predetermined intervals. The measuring hole 13a measures the abrasive to be passed.

That is, forming the respective measuring holes 13a at a uniform volume allows collecting a uniform quantity of abrasives in the respective measuring holes 13a, and setting a rotational speed of the rotating disc 13 constant allows conveying the abrasives collected in the respective measuring holes 13a to the abrasive transport path 12 at a constant speed, thereby the quantity of the abrasive ejected from the ejection nozzle 20 can be constant. In this embodiment, the abrasive volume per discharge gas amount of 1000 $cm^3$ under atmospheric pressure after the abrasive is discharged from the ejection nozzle 20 and released to the air can be equal to or less than 0.25 $cm^3$.

A rotation shaft 14 is fixedly secured to the center of the rotating disc 13. The rotation shaft 14 is inserted from an outside of the abrasive tank 11 to an inside of the abrasive tank 11 by passing through a top panel portion (or may be a bottom panel portion) of the abrasive tank 11. The rotation Shaft 14 is horizontally rotatable at a predetermined speed in the abrasive tank 11 by a rotating unit such as an electric motor 15.

A top surface of the rotating disc 13 may include a stirring blade (not shown) projecting upward. This stirring blade may stir the abrasive at an upper side of the rotating disc 13 during rotation of the rotating disc 13 to provide fluidity so that the abrasive can be easily introduced into the above-described measuring hole 13a.

The abrasive tank 11 housing the rotating disc 13 thus configured internally includes a storage space for storing the abrasive to be supplied to the ejection nozzle 20. The storage space internally includes the abrasive transport path 12 that communicates with the ejection nozzle 20 described below. An opening at one end 12a of the abrasive transport path 12 is faced to a rotation locus of the measuring hole 13a so as to be closed to or contacted with one surface of the rotating disc 13 (for example, a lower surface of the rotating disc 13 in the drawing).

An opening at one end 16a of an air introduction path 16 is disposed so as to be closed to or contacted with the other surface of the rotating disc 13 (for example, an upper surface of the rotating disc 13 in the drawing) and opposed to the opening at the one end 12a of the abrasive transport path 12. In view of this, the above-described rotating disc 13 is inserted between the opening at the one end 12a of the abrasive transport path 12 and the opening at the one end 16a of the air introduction path 16.

The above-described air introduction path 16 includes an other end 16b. The other end 16b opens in the abrasive tank 11 at a position higher than a position where the abrasives are stored. Applying pressure to the inside of the abrasive tank 11 by introduction of compressed gas allows introducing the compressed gas in the abrasive tank 11 to the abrasive transport path 12 through the air introduction path 16 and the measuring hole 13a of the rotating disc 13.

In FIG. 1, reference numeral 17 denotes an abrasive supply opening for introducing abrasive into the abrasive tank 11. The abrasive supply opening 17 is configured so that the abrasive which is recovered in the abrasive recovery chamber 41 is introduced into the abrasive tank 11 by opening and closing an on-off valve 18 which is disposed at the abrasive supply opening 17 and communicates with a lower end of the abrasive recovery chamber 41.

The apparatus for supplying a constant quantity of abrasive 10 described with reference to FIG. 1 shows an exemplary configuration as an apparatus for supplying a constant quantity of abrasive of a direct pressure type that supplies the abrasive together with the compressed gas in the abrasive tank 11 which is pressurized. Instead of this, the apparatus for supplying a constant quantity of abrasive 10 may be configured such that the abrasive tank 11 is opened to atmosphere, and the abrasive transport path 12 is communicated with a mixing chamber (not shown) of a blasting gun 19 of a suction type as illustrated in FIG. 2, then the compressed gas from a compressed gas supply source is ejected from a nozzle (not shown) disposed in the mixing chamber of the blasting gun 19, thus, negative pressure is created in the abrasive transport path 12 to suck the abrasive in the measuring hole 13a of the rotating disc 13. In this case, the ejection nozzle 20 which will be described below is further attached to the tip of the blasting gun 19 of the suction type.

To prevent clogging of the abrasive in the ejection nozzle 20 described below and to perform scribing at high accuracy, it is preferred that the quantity of abrasive to be supplied to the ejection nozzle 20 be comparatively small.

The supply quantity of the abrasive can be adjusted by adjusting the dimension of the measuring holes 13a disposed in the rotating disc 13 of the apparatus for supplying as constant quantity of abrasive 10 or the rotation speed of the rotating disc 13. However, an excessively small dimension of the measuring hole 13a makes entrance of the abrasive to the measuring hole 13a difficult, causing inaccurate measurement. Excessively slow rotation speed of the rotating disc 13 makes the supply of the abrasive intermittent and causes irregular supply. Accordingly, in the case where the abrasive less than the lowest quantity that can be quantitatively supplied by the apparatus for supplying a constant quantity of abrasive 10 needs to be quantitatively supplied, as illustrated in FIG. 1 and FIG. 2, the abrasive transport path 12 may be branched into the branched paths 121 and 122, and the ejection nozzles 20 described below may be disposed at the respective branched paths 121 and 122.

Ejection Nozzle

The abrasive from the apparatus for supplying a constant quantity of abrasive 10 thus configured is introduced into the ejection nozzle 20 provided with a slit-shaped ejection opening 21 for ejection.

The slit-shaped ejection opening 21 of the ejection nozzle 20 has a width δ. The width δ can be selected within a range of 10 μm to 500 μm according to a width of a groove or cut-off line to be formed by scribing. The slit-Shaped ejection opening 21 with a length L of 5 to 5000 times the selected width is formed. Then, the mixed fluid of the compressed gas and the abrasive squeezed into a slit-shape is ejected through the ejection opening 21. Thus, scribing for forming a fine groove can be performed without attaching a mask material to the workpiece W.

A flow path for the abrasive formed in the ejection nozzle 20 includes a cylindrical introduction flow path 22 and a rectifying portion 23. The introduction flow path 22 communicates with the above-described abrasive transport path 12 so as to extend the abrasive transport path 12. The rectifying portion 23 rectifies a flow of the fluid from the introduction flow path 22 into the above-described slit shape. Accordingly, as illustrated in FIG. 4C, in a cross section of the ejection nozzle 20 (a cross section taken along the line C-C of FIG. 4B) parallel to the moving direction of the abrasive and perpendicular to the longitudinal direction of the ejection opening 21, the rectifying portion 23 gradually narrows down a width thereof from a width equal to a width of the introduction flow path 22 to a width equal to a width of the ejection opening 21.

Figure 4:
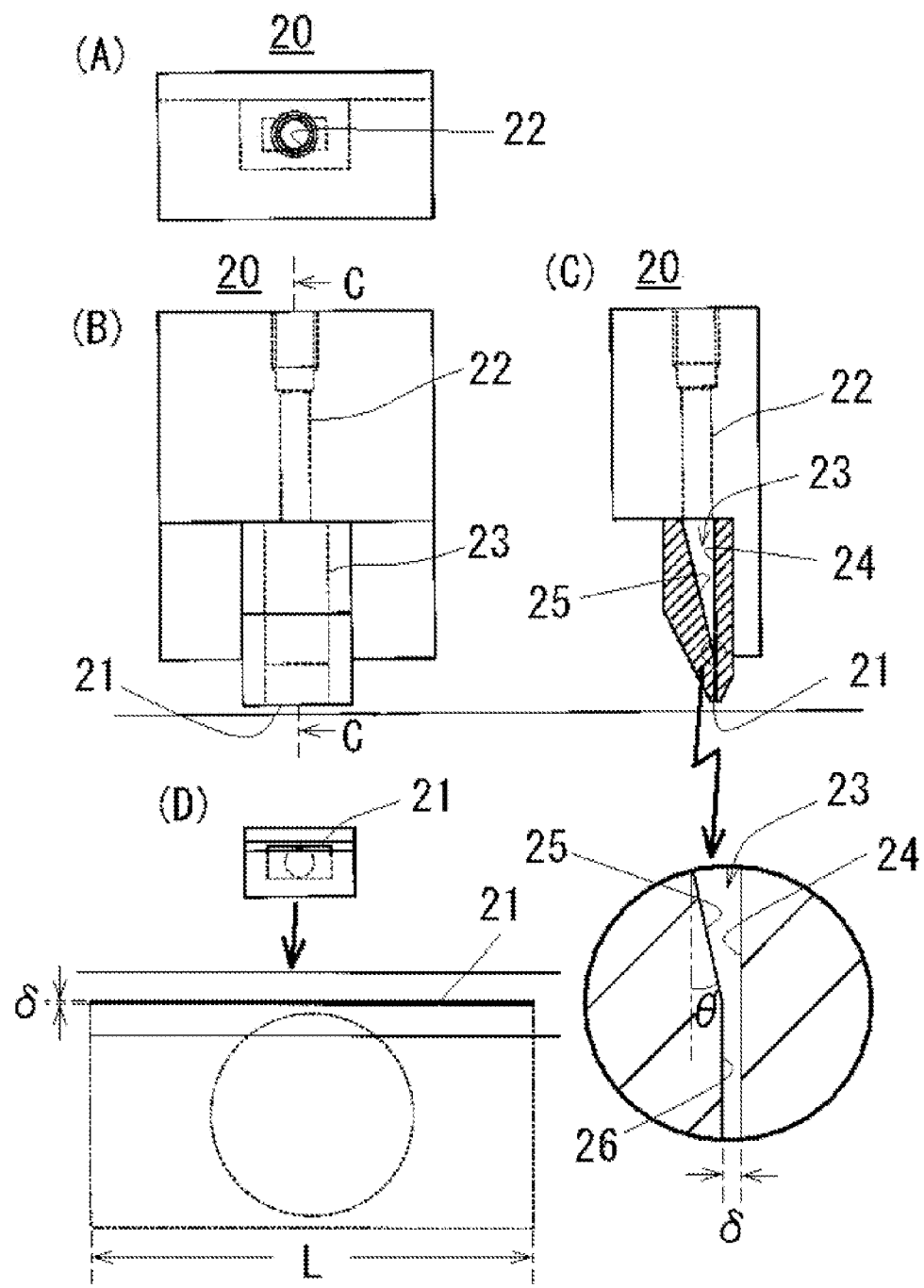
FIG. 4A to FIG. 4D are drawings of the ejection nozzle.

The rectifying portion 23 is preferred to be formed as a space defined by a first flat surface 24, an inclined surface 25, and a second flat surface 26 as illustrated in FIG. 4C. The first flat surface 24 communicates with one of longitudinal sides of the ejection opening 21 from an opening end of the introduction flow path 22 and is parallel to a flow direction of the abrasive. The inclined surface 25 gradually approaches the first flat surface 24 as the inclined surface 25 extends from the opening end of the introduction flow path 22 to the ejection opening 21. The second flat surface 26 is continuous with the inclined surface 25 and parallel to the first flat surface 24 with a distance δ equal to the width δ of the ejection, opening 21 inbetween. More preferably, the angle θ of the inclined surface 25 relative to the first flat surface 24 is equal to or less than 15°.

Even in the case where the rectifying portion 23 is formed in a bilaterally symmetrical V shape by inclined both the surfaces 24, 25 (not shown), the scribing according to the present invention can be performed. However, compared with such flow path, the flow path formed between the inclined surface 25 and the vertical surface 24 only as an example as illustrated in FIG. 4C is preferred in terms of difficulty in generation of abrasive clogging in the ejection nozzle 20.

Processing Conditions

Abrasive

The abrasive to be used in the scribing according to the present invention is selected as follows. The particle diameter of the abrasive to be used is selected according to the width δ of the ejection opening 21 of the ejection nozzle 20 to be used. The median diameter of the abrasive to be used is equal to or less than one-half of the width δ of the ejection opening 21 of the above-described ejection nozzle 20 and the maximum particle diameter of the abrasive is smaller than the width δ of the ejection opening 21.

As described above, the ejection opening 21 of the ejection nozzle 20 has an extremely small width δ, which is 10 μm to 500 μm. Accordingly, when the abrasive is introduced into the ejection nozzle 20, clogging occurs easily in an inside of the ejection nozzle 20. Therefore, it is preferred that the abrasive to be used be screened minutely and the particle diameter be uniform.

The material of the abrasive to be used is not especially limited. However, it is preferred that the material has hardness equal to or more than the workpiece W. In the case where a layer (an under layer) with a higher hardness than a layer to be processed is formed under the layer to be processed like the case where the workpiece W is a photoelectric conversion layer in the above-described solar cell, use of the abrasive with a higher hardness than the layer to be processed and with a lower hardness than the under layer is preferred. This is because damage to the under layer can be reduced and only the layer to be scribed can be selectively processed.

Use of the abrasive with a high specific gravity is preferred because the abrasive with a high specific gravity is excellent in a straightness after ejection from the ejection nozzle 20 and the width of the groove to be formed can be similar to the width δ of the ejection opening 21. Use of the abrasive with specific gravity equal to or more than 5 is more preferred.

Ejection Distance

In ejection of the abrasive, a distance (ejection distance) between the ejection opening 21 of the above-described ejection nozzle 20 and a surface to be processed of the workpiece W is approximated within the range of 0.1 mm to 3.0 mm.

Thus, the abrasive is ejected with a short ejection distance. This allows the abrasive ejected together with the compressed gas from the ejection opening 21 of the ejection nozzle 20 to form a fine groove at high accuracy by collision with the workpiece W before the abrasive is tremendously spread without attaching the mask material.

Ejection Quantity of Abrasive

Regarding the ejection quantity of abrasive to be ejected from the ejection nozzle 20, as the specific gravity or the volume percent of the abrasive included in the ejected compressed gas increases, the cutting capability is improved and workability is increased. However, in the case where the abrasive with a high concentration or a high volume percent is ejected, clogging of the abrasive easily occurs in the ejection nozzle 20 and as the specific: gravity of the abrasive increases, forming a thin-width groove is difficult. Accordingly, the abrasive is supplied from the apparatus for supplying a constant quantity of abrasive 10 to the ejection nozzle 20 so that the ejection quantity of the abrasive from each ejection nozzle 20 is to be an abrasive volume of equal to or less than 0.25 cm$^3$ relative to discharge gas amount 1000 cm$^3$ in a range of ejection pressure of 0.2 MPa to 0.6 MPa.

EXAMPLES

The following describes examples of a process by the scribing method according to the present invention.

Example 1

Scribing Glass Substrate

An ejection nozzle with a slit-shaped ejection opening with a width 40 μm and a length 7 mm was disposed at an ejection distance of 0.3 mm to the surface of a glass substrate (6.5 by new Mohs hardness (hereinafter, all hardness will be indicated by "new Mohs hardness")) where masking was not performed. The process was performed while the abrasive (WA#3000: hardness of 12 and median diameter of 4 μm) was ejected at an ejection quantity of 0.6 g/min and an ejection pressure of 0.5 MPa while moving the ejection nozzle at the moving speed of 3 m/min in the longitudinal direction of the ejection opening. The volume of the abrasive relative to the discharge gas amount was as described above.

As a result of scribing by the above-described method, a groove with a width 80 μm and a depth 10 μm was precisely formed by directly ejecting the abrasive on the glass substrate without the masking.

Example 2

Scribing Photoelectric Conversion Film of Solar Cell

In a process of manufacturing a Copper-Indium-Gallium-Selenium (CIGS) compound thin film solar cell, a photoelectric conversion layer (CIGS film: hardness of approximately 1.2 to 3.0) formed on an Mo conducting layer (hardness of 5.5) formed on the surface of the glass substrate was scribed by the method according to the present invention thereby a groove was formed.

The abrasive was ejected using an ejection nozzle with a slit-shaped ejection opening with a width 40 μm and a length 7 mm and at an ejection pressure of 0.4 MPa, an ejection distance of 0.3 mm, and a moving speed of 3 m/min. The volume of the abrasive relative to the discharge gas amount was as described above.

In the above-described conditions, scribing was performed using stainless steel shots, glass beads, zircon beads, white alundum (WA), all of which had an median diameter of 20 μm, as the abrasive to be ejected. The results are listed in Table 1.

Test According to Example 2

TABLE 1

Scribing test on the photoelectric conversion film of a solar cell

| | | Abrasive | | Width of | Processing state | |
|---|---|---|---|---|---|---|
| Material | Hardness | Specific gravity (g/cm³) | Ejection quantity (g/min) | cut-off line (μm) | General comment | Processing state |
| Stainless steel | 4.5 to 5 | 7.6 | 1.5 | 80 | Excellent | Only CIGS film removed |
| Glass | 6.5 | 2.5 | 0.5 | 250 | Good | Only CIGS film removed |
| Zircon | 9 | 3.54 | 0.6 | 140 | Slightly Bad | Mo film partially peeled |
| WA | 12 | 3.85 | 0.6 | 160 | Bad | Mo film also removed |

Notice: The particle shape of WA is polygonal while the particle shapes of the others are spherical. As described above, the Mo film was removed by cutting with the WA, however, cut-off lines with a constant width and depth were able to be formed.

As results described above, even in the case where the abrasives were directly ejected without masking, scribing a groove with a width equal to or less than 1 mm, which had been conventionally impossible, was succeeded in examples using any abrasive.

However, a conducting layer with a high hardness (an Mo layer) was formed as an under layer like the case where scribing is selectively performed to the photoelectric conversion layer of a solar cell. In the case where the photoelectric conversion layer with a low hardness (a CIGS layer) was formed on the conducting layer, it was confirmed that use of an abrasive with a higher hardness than the photoelectric conversion layer and with a lower hardness than the conducting layer which was the under layer (stainless steel shot in the above-described example) allowed forming a groove selectively only on the photoelectric conversion layer without removing the conducting layer which was the under layer.

Among the above-described examples, in the example of using the glass bead as an abrasive, although the glass bead is a material with a higher hardness than the hardness of Mo which was the under layer, scribing was able to be performed only on the CIGS layer without removing the Mo layer. This action is possibly an effect obtained because the glass bead has a tremendously low specific gravity, which is 2.5 g/cm³, compared with other abrasives.

Meanwhile, in the example where the glass bead with a low specific gravity was used, the width of the cut-off line formed by the scribing was 250 μm, which was a width wider than equal to or more than 6 times the case where the stainless steel bead was used. In view of this, as illustrated in FIG. 5, the width of the cut-off line formed becomes large as the specific gravity of the abrasive is reduced.

Accordingly, reducing the specific gravity of the abrasive to be used allows reducing damage to the Mo layer even in the case where the abrasive with a higher hardness than the Mo layer is used. However, in this case, a width of a cut-off line or a groove to be formed is enlarged, narrowing the area of a portion contributing to electric generation as a solar cell.

Accordingly, in a field where forming a cut-off line or groove of narrow width is required, such as scribing to a photoelectric conversion layer in a manufacturing process of a solar cell, formation of a narrow width cut-off line or groove is achieved as the specific gravity of the abrasive to be used is increased.

Figure 5:
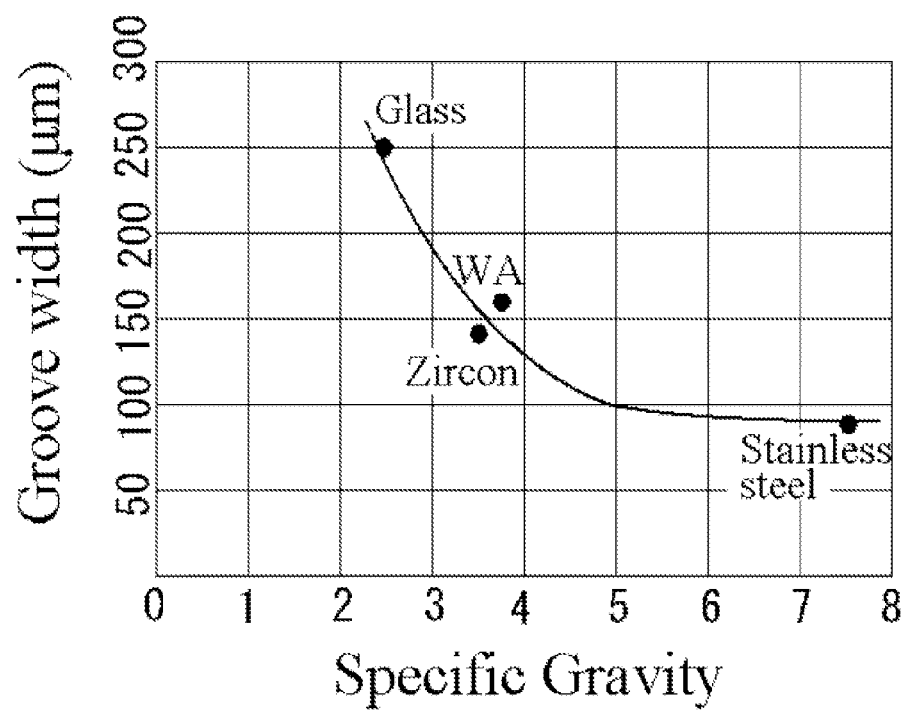
FIG. 5 is a graph illustrating a correlation relationship between the specific gravity of the abrasive and a width of the formed groove.

Especially, as apparent from FIG. 5, in the case where the specific gravity of the abrasive to be used is equal to or more than approximately 5, the width of the groove formed in this example where the ejection nozzle with the ejection opening with a width of 40 μm is used, is equal to or less than 100 μm. Accordingly, the width of the groove to be formed can be reduced to 2.5 to 2 times the width of the ejection opening. This is preferred in terms of improvement of process accuracy of a groove to be formed.

In a processing example using a glass bead, in the case where the glass bead once used is recovered for reuse, since broken glass bead is mixed, the Mo layer which is an under layer is also cut in continuous and circulative use. Hence, to reduce damage of the Mo layer, it is required to use the glass bead only one time and then throw away the glass bead.

Accordingly, as an abrasive for scribing to a photoelectric conversion layer of a solar cell, it was confirmed that use of an abrasive with a hardness 5, which is a higher hardness than a hardness of the photoelectric conversion layer but a lower hardness than a hardness of the conducting layer and made of a stainless steel with a comparatively high specific gravity, which is 7.6, is preferred.

Thus the broadest claims that follow are not directed to a machine that is configure in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described:
What is claimed is:
1. A scribing method by blasting, comprising:
   using a blasting machine that includes an ejection nozzle, the ejection nozzle having a slit-shaped ejection opening with a width of 10 μm to 500 μm and a length of 5 to 5000 times the width; and an abrasive with a median diameter equal to or less than one-half of the width of the ejection opening of the ejection nozzle, the abrasive with a maximum particle diameter smaller than the width of the ejection opening; and ejecting the abrasive together with compressed gas on a surface of a workpiece without masking at an ejection distance of 0.1 mm to 3.0 mm and at an ejection pressure of 0.2 MPa to 0.6 MPa so that 0.25 cm$^3$ or less of the abrasive is included per 1000 cm$^3$ of the compressed gas discharged from the ejection nozzle.

2. The scribing method by blasting according to claim 1, wherein
the abrasive and a cutting chip powder on the workpiece are sucked and recovered in a vicinity of a surface of the workpiece in an ejection position of the abrasive.

3. The scribing method by blasting according to claim 1, wherein
the abrasive has a specific gravity of equal to or more than 5.

4. The scribing method by blasting according to claim 1, wherein
the workpiece is a photoelectric conversion layer formed on a conducting layer of a solar cell, the photoelectric conversion layer having a lower hardness than the conducting layer, and
the abrasive has a higher hardness than the photoelectric conversion layer, and has a lower hardness than the conducting layer.

* * * * *